April 30, 1963  C. C. BAUM  3,088,037
RADIATION DETECTOR
Filed Jan. 3, 1961
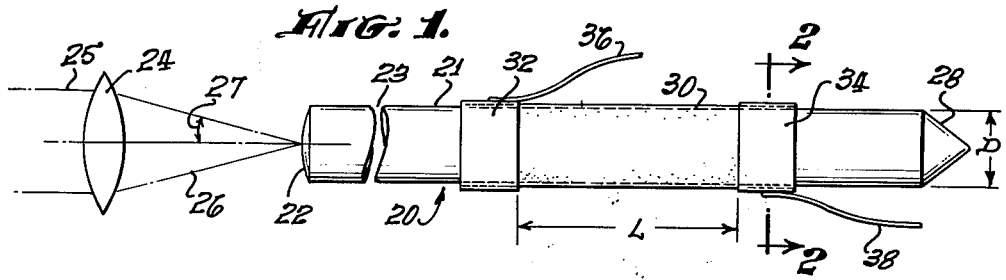
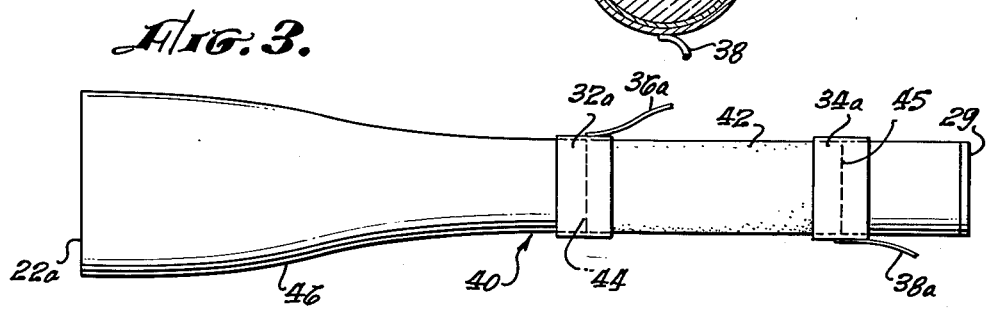
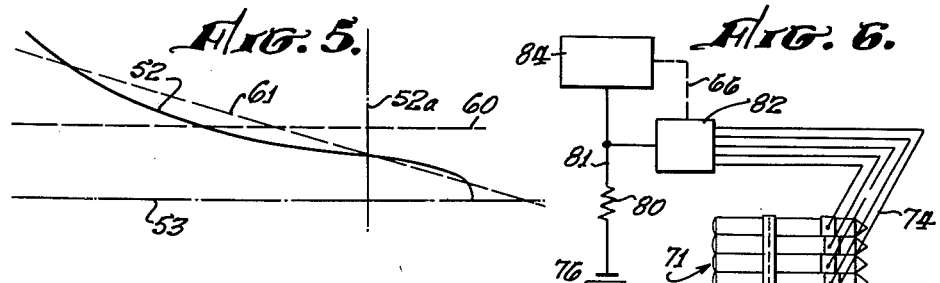
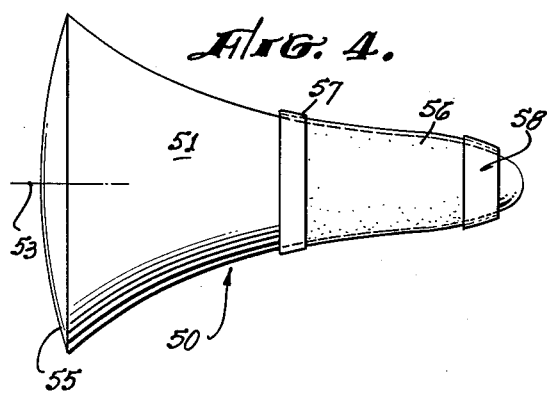
CUSTER CHARLES BAUM,
INVENTOR.
BY
Barleow + Lewis United States Patent Office 3,088,037
Patented Apr. 30, 1963

3,088,037
RADIATION DETECTOR
Custer Charles Baum, Montecito, Calif., assignor to The Te Company, Santa Barbara, Calif., a corporation of California
Filed Jan. 3, 1961, Ser. No. 80,469
3 Claims. (Cl. 250—227)

This invention is concerned generally with the selective detection of electromagnetic radiation incident upon small elements of area.

A general object of the invention is to provide a micro-module radiation detector for producing an electrical signal in response to radiation incident upon a surface area of well delineated form that can be made very small.

The invention further provides such a micro-module detector having a novel configuration that permits assembly of a large number of detector elements with their light-receiving apertures closely adjacent, while maintaining complete independence of response of the respective elements. Thus each detector element may be associated with a distinct electrical circuit, which responds selectively and exclusively to radiation incident upon a well defined receiving surface or entrance aperture.

The entrance apertures of such an assembly may be arranged in a wide variety of different configurations, depending upon the purpose for which they are intended. The apertures may be linearly aligned, for example, or may form a plane or curved surface that is well adapted to receive an optical image. Alternatively, the respective entrance apertures may conveniently be arranged in different planes, if desired.

A further important feature of the invention is that the actual conversion of energy by each element from electromagnetic to electrical form is not required to take place within a space of the same order of size as the entrance aperture. On the contrary, that energy conversion may be distributed over a surface of much larger area, or through a volume that is not limited by the size of the entrance aperture.

Each micro-module detector in accordance with the invention comprises a body of material capable of transmitting the radiation of interest and having the form of an optical fiber. One end of the fiber is preferably optically polished and serves as entrance aperture for the detector. The side walls of the fiber are smooth and the index of refraction for the radiation of interest is such as to produce total reflection of all radiation that forms an angle with the fiber axis less than some critical value. Hence the cone of radiation within that critical angle is transmitted along the fiber with substantially zero loss from the multiple reflections at the side walls. The other end of the fiber may be formed in any desired manner, preferably providing a retroreflector for any radiation reaching the end of the fiber. In accordance with the invention, suitable radiation responsive means are provided at a portion of the fiber intermediate its length.

The radiation detecting means for each fiber typically comprises a zone of photoresponsive material arranged in such a way as to absorb radiation transmitted along the fiber, and electrode means for connecting that photoresponsive material in an electrical circuit to detect variations in its properties when subjected to radiation.

Many different types of photosensitive action are well known which are suitable for producing an electrical signal in response to the presence of radiation. Those actions include, in particular, photovoltaic effects, whereby a current may be produced in an output circuit without requiring external bias; and photoconductive effects, which normally require external bias in the associated electrical system. For clarity of description, and without implying any limitation upon the scope of the invention, the latter will be described primarily with reference to photoconductivity as the photosensitive process.

In one illustrative form of the invention the body of the fiber itself is suitably treated over a selected portion of its length to render it photoconductive. Electrodes then typically comprise bands of conductive material surrounding the fiber at longitudinally spaced positions and directly engaging the surface of the photoconductive portion. Electrical leads may be connected to the electrodes in any desired manner for connection to a suitable sensing circuit.

In accordance with a further aspect of the invention, photoconductive material may be applied to a surface zone of the optical fiber, either directly or in combination with a suitable bonding agent. The fiber surface is suitably treated, as by etching, or the applied material is selected to have an index of refraction suitably related to that of the body of the fiber, so that reflection is no longer total at the fiber side walls, but an appreciable fraction of the radiation enters the photoconductive surface layer. Electrodes may be positioned in any desired manner in contact with spaced portions of the photoconductive zone for sensing changes in its conductivity.

An important advantage of the invention is that the resistance of each element for a given degree of illumination can conveniently be varied within wide limits by suitable selection of the effective length of the photoconductive zone, independently of the fiber diameter D. With electrodes in the typical form of bands surrounding the fiber at an axial spacing L, the effective resistance R of a photoconductive surface layer of the type just described is proportional to $L/D$. If $L=\pi D$, R equals the standard resistance per square for the particular layer structure selected. Under those illustrative conditions, the surface area of the radiation absorbing zone is larger than the sectional area of the fiber by a factor of $4\pi$, or approximately 12. Corresponding relations apply for photoconductive material formed within the body of the fiber.

The electrically responsive portion of the fiber may be formed at substantially any desired longitudinal position with respect to the entrance aperture, and that position need not be the same for the respective detector elements of an assembly. That fact contributes greatly to the flexibility with which elements may be assembled, particularly when their entrance apertures are to define a surface for reception and detection of an optical image.

In accordance with a further aspect of the invention, the individual fibers of the respective detector elements may embody optical features which enhance the effectiveness of their action. For example, the entrance end face of each fiber may be curved as desired to provide lens action. Additionally, the diameter of the fiber at the photosensitive region need not be the same as that at the entrance aperture, but may be either larger or smaller as may be desired, for example to enhance the intrinsic signal to noise ratio of the system. The fiber may, for example, be bounded laterally by a surface of revolution, such as is generated by rotation of a line about an axis. The generatrix of such a surface may be a straight line, forming a cylinder or a cone; or it may be a curve of any desired form. Special response characteristics are obtainable by suitable selection of the detailed form of generatrix for such a surface and by suitable longitudinal placement of the sensitive zone along the resulting figure. Such characteristics may be determined by direct test or may be calculated in accordance with the known principles of optics.

The described micro-detector structure has the great advantage that it is well suited for use at low temperatures. For example, the entire fiber can be immersed in a refrigerated liquid medium, such as liquid nitrogen or liquid helium, for example. The filament structure of the detector then forms an excellent radiation shield at the temperature of the refrigerant, so that the radiation sensitive surfaces receives substantially no warm surface radiation except through the entrance pupil of the optical system.

In that connection, it is particularly advantageous that the resistance of the radiation responsive zone may be conveniently controlled during construction, as by suitable spacing of the electrodes. Thus, when the radiation sensitive material has a large temperature coefficient of resistance, the electrode spacing may be varied in accordance with the temperature at which each unit is to be used. Elements having essentially equal resistance values at widely different temperatures may thus be produced without requiring any change in aperture size or other optical characteristics and without loss of signal information.

A full understanding of the invention and of its further objects and advantages will be had from the following description of certain illustrative manners in which it may be carried out, of which description the accompanying drawings form a part. The particulars of that description are intended only for illustration of the invention, and not as a limitation upon its scope, which is defined in the appended claims.

In the drawings:

FIG. 1 is a schematic elevation representing an illustrative radiation detector in accordance with the invention;

FIG. 2 is a transverse section on the line 2—2 of FIG. 1;

FIG. 3 is a schematic elevation representing a modification;

FIG. 4 is a schematic elevation representing a further modification;

FIG. 5 is a schematic diagram illustrating geometrical relations of FIG. 4; and

FIG. 6 is a schematic drawing representing an illustrative system employing an assembly of detectors.

In the illustrative unit detector of FIG. 1, an optical fiber is represented generally at 20, with polished front end face 22 forming the entrance aperture. Radiation may be directed upon entrance aperture 22 in any desired manner, as by a suitable optical system represented schematically by the lens 24. That optical system may for example, receive radiation 25 from a distant source and focus it as a convergent cone 26 of half angle 27 upon aperture 22. Entrance face 22 may be spherically or otherwise curved, either convexly as represented in the drawing or concavely, so that it forms a part of the overall optical system. Whereas optical fiber 20 may have substantially any desired dimensions, particular advantages are obtainable when the fiber diameter, or at least the entrance aperture, is very small, for example of the order of 0.001 to 0.01 inch. The normal thickness of the fiber, and particularly of the surface layers to be described, is exaggerated in the drawings for clarity of illustration. The radiation intercepted by aperture 22 then typically comprises a small and well defined portion of an extended optical image formed by the system 24. Additional detector units are typically assembled closely adjacent unit 20 to detect radiation at corresponding adjacent points of the optical image.

Optical fiber 20 is shown for clarity of illustration as a circular cylinder, but may have a cross-section of substantially any desired form, such as square or hexagonal, for example. Its side wall or walls 21 are optically smooth and form a totally reflecting guide for the radiation entering aperture 22 in accordance with well known optical principles. Because of the high efficiency of such total reflection, it is feasible to make the fiber very long compared to its diameter. The great freedom that is available in selection of fiber length is represented schematically by the break at 23. The fiber may also be gently curved longitudinally, in accordance with known principles of fiber optics.

The body of the fiber may be fabricated by known techniques. In accordance with some aspects of the invention, fiber 20 may be formed of any suitable material capable of transmitting radiation of the desired wavelength. Such materials include, for example, glasses of many different types, which transmit a range of wavelengths including visible light; quartz, with good transmission far into the ultraviolet region; and synthetic materials such as plastics, many of which transmit effectively far into the infrared. Germanium has useful transmission in the infrared region, and is illustrative of many special materials capable of transmitting radiation within particular wavelength regions.

The rear end of fiber 20 is preferably so formed as to reflect radiation incident along the length of the fiber and return it toward front end 22. Such a retroreflector may be designed in many different ways in accordance with known optical principles. As illustratively shown in FIG. 1, the rear fiber end comprises a polished conical surface 28, which may rely upon total reflection for its action. Alternatively, the reflecting surface or surfaces may be coated with a suitable reflective layer, as represented at 29 in FIG. 3.

In FIG. 1 a photoconductive zone is represented at 30, extending axially along surface 21 between the two electrodes 32 and 34. Those electrodes comprise bands of conductive material surrounding the fiber. They make electrical contact with the end portions of zone 30, which they may directly overlie. The electrodes typically comprise metal films deposited chemically or by evaporation in vacuum. The metal is preferably selected with due regard for the electrical properties of the interface between it and the material of photoconductive layer 30. Gold is illustrative of metals that are generally satisfactory for making electrodes.

Many different photoconductive materials are known which can be applied to a selected limited portion of fiber surface 24 as a film or layer. An illustrative material is lead sulfide, which may be deposited by wet chemistry or by evaporation in vacuum. Cadmium sulfide may be deposited from the vapor phase as a film of microcrystals; and may be applied alternatively as a polycrystalline aqueous suspension, for example. The published literature describes many other materials and techniques for producing photoconductive layers that are suitable for carrying out the invention.

Photoconductive layer 30 is typically limited to the desired portion of fiber surface 24 by first protecting the adjacent surface with a mask of any suitable type. That mask may be spaced from the surface, especially when the photoconductive layer is to be deposited by the familiar technique of evaporation in vacuum. Ordinarily the mask is preferably formed directly on the surface, as by direct painting or by known photographic methods. It is then convenient to utilize for the mask a material that can be removed by chemical or solvent means without injuring the photoconductive layer. The mask may, for example, comprise a resist such as is familiar in the art of photoengraving.

In general, photoconductive layer 30 may be formed either before or after electrodes 32 and 34. Procedures in which the electrodes are formed first are illustrated by the following:

*Example 1*

The fiber surface is masked except for the areas of the electrodes, and electrode rings are deposited on the unmasked areas, for example by evaporation in vacuum of indium or other suitable metal. The mask is then removed between the electrodes, and a photoconductive layer of lead sulfide, is applied, extending continuously between the electrodes and in electrical contact with them. Other known photoconductive materials may be substituted for the lead sulfide in forming layer 30, including, for example, lead selenide, cadmium sulfide and selenide, and thallous sulfide and selenide. Before applying certain types of photoconductive layer, the fiber surface may be roughened slightly, as by chemical etching. Known techniques are available for lightly etching polished surfaces of such fiber materials as have been described.

*Example 2*

An illustrative procedure for applying the photoconductive surface prior to the electrodes is as follows: a mask is placed over the ring area reserved for the photosurface, and a resist is applied to the remainder of the fiber surface. The mask is then removed and photoconductive material, typically lead sulfide, is applied in its place. The central portion of the photoconductive zone is then masked, and electrode rings are applied in electrical contact with the end portions of that zone.

Conductive leads 36 and 38 are applied as required to the electrodes, using such known techniques as silver paste, aquadag, soldering or pressure application for obtaining satisfactory electrical contact. The entire fiber detector assembly may be covered, if desired, by a film of insulative material having a suitable index of refraction.

*Example 3*

An illustrative detector having photosensitive volume typically comprises a fiber of germanium suitably doped with copper to produce a photoconductive zone. Such a detector is represented in FIG. 3, and may be produced, for example, by first plating a ring of copper at 42 on the surface of the germanium fiber 40. The width of the ring is defined in known manner, as by suitable masking, and is preferably determined to give the desired absorption at the copper centers to be produced for light of the wavelength for which the detector is designed. That absorption may be calculated, or may be determined by suitable test measurements. Copper from the surface ring is then caused to diffuse into the body of the germanium fiber by the usual procedure of firing at controlled temperature and for a selected period of time. The resulting metal impurity within the germanium renders the body of the fiber photoconductive within an extended region that is indicated at 44, 45. The remaining surface copper is removed, as by etching, taking necessary precautions not to etch other areas of the fiber surface. Electrode rings 32a and 34a are then applied, overlapping the ends of the area that had been copper plated and electrically contacting opposite ends of photoconductive body 44. Electrical leads 36a and 38a are connected to the electrodes, and an insulative coating may be added, as in the previously described examples.

Alternatively, spaced rings of excess copper may be left on the fiber surface to provide electrodes or to form a base for deposition of additional electrode material. Volume photoconductivity can also be produced in such semiconductive materials as germanium with other metals than copper, including, for example, gold, zinc and silicon.

FIG. 3 further illustrates a detector unit in which entrance aperture 22a is of larger diameter than the main body of the fiber which carries the photosensitive structure 44, 45. The two regions of the fiber are connected by a tapered coupling section 46 having maximum conical angle small enough to maintain total reflection of the transmitted radiation. If D and d are the diameters of the entrance and detector sections of the fiber, the effective signal to noise ratio of the overall detection system is potentially increased by a factor of from $D/d$ to $(D/d)^2$. The importance of any such improvement in signal to noise ratio, especially for detecting intrinsically weak signals, is well known.

FIG. 3 also illustrates an entrance aperture 22a of plane configuration. Such an entrance face may be substituted for the curved faces shown in FIGS. 1 and 4 if the focusing action of the latter is not required. And a fiber of the type shown in FIG. 3 may be provided with an aperture having any desired optical form.

Radiation entering a detector may be filtered as desired by placing a conventional filter in front of the entrance aperture. An advantage of the invention is that a filter may also be incorporated as part of the detector unit. For example, a suitable dielectric coating or series of coatings of known type may be applied to entrance face 22. Also, part or all of the fiber body may be constructed of material having the desired selective absorption.

FIG. 4 represents a further illustrative configuration in accordance with the invention, wherein the optical fiber 50 is bounded laterally by a surface of revolution 51. That surface may be considered to be generated by rotation of a line 52 about the axis 53 (FIG. 5). A sensitive zone 56 of limited axial extent is provided intermediate the length of fiber 50. Electrode structures 57 and 58 surround the fiber in electrical contact with the end portions of zone 56. That zone and its electrodes may be of any suitable radiation responsive type, as already explained.

The form of line 52, commonly referred to as the generatrix of surface 51, is selected in accordance with known optical principles to give any specific type of optical behavior that may be desired. In the present illustrative example, line 52 is a curve of S-form, meeting axis 53 at a steep angle, typically 90°, at the rear end of the detector and providing a pronounced flare at the forward end where it meets the entrance aperture 55, shown illustratively as a spherical lens surface. Sensitive zone 56 includes the transverse plane at which generatrix 52 reverses its curvature, indicated at 52a in FIG. 5. Zone 56 thus comprises a portion of concave axial curvature and a portion of convex axial curvature. If zone 56 and its electrodes are placed entirely forward or entirely back of the point of inflection of the generatrix, the axial curvature of the zone surface may be made entirely either concave or convex. The present illustrative fiber shape is particularly advantageous since it tends to combine the advantages of a strictly cylindrical form, corresponding to a rectilinear generatrix parallel to axis 53 as indicated at 60; and a conical form, corresponding to an oblique rectilinear generatrix, as typically shown at 61. More complex fiber forms may also be employed, and may, for example, involve more than one inflection plane.

Micro-module detectors of the described type may be employed in a wide variety of known systems in which previously available types of detection units are customarily used. An assembly of detectors is represented schematically at 70 in FIG. 6. The entrance apertures are arranged in closely adjoining relation in a surface 71 upon which an optical image may be formed by means not explicitly shown. The forward electrodes, for example, of all the detectors are connected to a common lead 72, while their rear electrodes are connected to individual leads indicated at 74. A suitable source of electric power, represented schematically as the battery 76, has one terminal connected to lead 72 and the other terminal connected via a load impedance 80, the line 81, and a switching device 82 to the leads 74. Device 82 may be of any suitable type, preferably electronic in nature, which effectively connects line 81 sequentially to each of the lines 74, thereby applying voltage from source 76 sequentially across the photoresistive structures of the individual detectors of assembly 70. A voltage signal is thereby developed across impedance 80, which is relatively small if the energized detector is dark, and is relatively large if the detector is illuminated and its resistance thereby reduced. That signal is supplied from line 81 to any desired utilization system, represented schematically at 84. System 84 may be coupled in known manner with switching device 82, as represented schematically at 86, so that action of the utilization system is suitably correlated with the effective switch position. For example, system 84 may include a cathode ray tube in which the beam position on the tube face corresponds to the position of the energized detector in assembly 70; and the intensity of the beam is controlled by the input signal from line 81. The resulting image on the tube screen then corresponds typically to the optical image incident upon assembly 70.

I claim:
1. A radiation detector comprising an optical fiber, means adjacent one end of the fiber for admitting electromagnetic radiation into the body of the fiber in a direction to be transmitted longitudinally thereof, said fiber being bounded laterally by a surface of revolution of which the generatrix is a curve of S-form, a layer of photoconductive material covering a zone of the fiber adjacent the inflection point of said curve, and electrode means electrically contacting axially spaced portions of said layer.

2. A radiation detector comprising an axially symmetrical optical fiber of substantially circular section having a polished end face for admitting electromagnetic radiation into the body of the fiber, said fiber tapering longitudinally to form an intermediate section of smaller diameter than said end face, structure forming a longitudinally extending zone of photoconductive material adjacent the surface of said intermediate section of the fiber and exposed to radiation therein, two bands of electrically conductive material surrounding said intermediate section of the fiber in electrical contact with opposite end portions of said zone, and mutually insulated conductive leads connected to the respective bands, said bands and lead connections being contained within the longitudinal projection of said end face of the fiber.

3. In a system for remotely indicating the distribution of electromagnetic radiation incident from one side upon a surface; the combination of a plurality of optical fibers having one end of each fiber substantially in the surface and extending transversely of the surface on the other side thereof, means at said one end of each fiber for admitting radiation incident thereon into the body of the fiber, structure forming a photoconductive zone for each fiber exposed to radiation therein, electrode means directly contacting respective mutually spaced portions of the photoconductive zone of each fiber, indicating means remote from the fibers, and circuit means interconnecting the electrode means and the indicating means and including an independent lead for at least one of the electrode means of each fiber, said indicating means comprising means connected to said leads for applying electrical potentials independently between the electrode means of the respective fibers and circuit means responsive selectively to the magnitudes of the electric currents flowing in the respective leads.

References Cited in the file of this patent
UNITED STATES PATENTS

| | | |
|---|---|---|
| 1,316,350 | Case | Sept. 16, 1919 |
| 2,183,256 | Gabler | Dec. 12, 1939 |
| 2,327,222 | Sell | Aug. 17, 1943 |
| 2,354,591 | Goldsmith | July 25, 1944 |
| 2,695,964 | Schepker | Nov. 30, 1954 |
| 2,952,781 | Hersh | Sept. 13, 1960 |
| 2,964,636 | Cary | Dec. 13, 1960 |
| 2,967,248 | Nicoll | Jan. 3, 1961 |
| 2,976,447 | McNaney | Mar. 21, 1961 |
| 3,043,179 | Dunn | July 10, 1962 |
| 3,056,031 | McNaney | Sept. 25, 1962 |
| 3,058,002 | Sihvonen | Oct. 9, 1962 |